(12) United States Patent
Gelineau et al.

(10) Patent No.: US 9,671,523 B2
(45) Date of Patent: Jun. 6, 2017

(54) FIELD INSTALLABLE LIGHT CURTAIN STATUS MODULE

(71) Applicant: Banner Engineering Corp., Plymouth, MN (US)

(72) Inventors: Matthew Michael Gelineau, Blaine, MN (US); Calvin James Sargent, Bloomington, MN (US); Matthew John Schmitt, Somerset, WI (US); Charles Lee Osborn, Albertville, MN (US); Michael Shawn Bechtold, Brooklyn Park, MN (US)

(73) Assignee: Banner Engineering Corp., Plymouth, MN (US)

( * ) Notice: Subject to any disclaimer, the term of this patent is extended or adjusted under 35 U.S.C. 154(b) by 0 days.

(21) Appl. No.: 14/819,264

(22) Filed: Aug. 5, 2015

(65) Prior Publication Data
US 2017/0038494 A1    Feb. 9, 2017

(51) Int. Cl.
G06M 7/00 (2006.01)
G01V 8/20 (2006.01)
F16P 3/14 (2006.01)

(52) U.S. Cl.
CPC .............. *G01V 8/20* (2013.01); *F16P 3/144* (2013.01)

(58) Field of Classification Search
CPC .............. G06M 7/00; G01V 8/20; F16P 3/144
USPC .................... 250/221; 340/555–557
See application file for complete search history.

(56) References Cited

U.S. PATENT DOCUMENTS

| 5,015,840 A | 5/1991 | Blau |
| 5,198,661 A * | 3/1993 | Anderson ............... G01V 8/20 250/221 |
| 6,414,603 B1 | 7/2002 | Yamaguchi et al. |
| 6,778,079 B2 | 8/2004 | Weber |
| 6,856,862 B1 * | 2/2005 | Feltner ................... F16P 3/14 250/221 |

(Continued)

FOREIGN PATENT DOCUMENTS

EP    2474960 A1    11/2012

OTHER PUBLICATIONS

Sick AG, Technical Description EFI—Enhanced Function Interface, Dec. 13, 2012, p. 45, Configuration options via EFI, Germany.

(Continued)

*Primary Examiner* — Seung C Sohn
(74) *Attorney, Agent, or Firm* — Craige Thompson; Thompson Patent Law

(57) ABSTRACT

Apparatus and associated methods relate to a modular plug-in accessory including a connector for making pluggable electrical connection to a cascading electrical output port for providing cascading connection from an elongate light curtain, the accessory comprising an omni-directional light indicator to illuminate a light signal indicative of a status of the light curtain, wherein the accessory is configured to releasably make or break operative connection to the end cap containing the output port while the end cap is sealably connected to an end of the light curtain. In an illustrative example, the accessory may plug in directly to the terminal end of a light curtain. The receiving light curtain may be connected at the distal end of a string of light curtains. In some examples, the accessory may provide high visibility status indication information about any of the light curtain segments in the string of light curtains.

20 Claims, 12 Drawing Sheets

(56) References Cited

U.S. PATENT DOCUMENTS

| | | |
|---|---|---|
| 7,329,854 B2 | 2/2008 | Clifton et al. |
| 2001/0040213 A1 | 11/2001 | Shteynberg et al. |
| 2003/0020616 A1* | 1/2003 | Dodds .................. G08B 13/183 340/600 |
| 2004/0159778 A1* | 8/2004 | Sakaguchi ............... G01V 8/20 250/221 |
| 2006/0068643 A1 | 3/2006 | Akagi et al. |
| 2012/0019350 A1 | 1/2012 | Klingelhofer et al. |
| 2013/0221204 A1 | 8/2013 | Mueller et al. |

OTHER PUBLICATIONS

Leuze Electronic, MLD 500 MLD 300 Product Information, 2010, Owen, Germany.

Leuze Electronic, MLD 300 MLD 500 Safe Implementation and Operation, 2011, Owen-Teck, Germany.

Sick AG, Operating Instructions M4000 Advanced M4000 Advanced A/P and M4000 Area 60/80, Nov. 28, 2012, p. 19, Controls and Status Indicators, Germany.

Sick AG, Safety Light Curtains Photoelectric Safety Switches, May 2015, p. 46 and 73, Germany.

Omron, Safety Light Curtain F3Sg-RA, May 2015, p. 4-16, 21, 30, 35, and 50, United States.

International Search Report and Written Opinion in PCT/US2015/045179, Oct. 12, 2016, 11 pages.

PCT Chapter II Demand dated Feb. 16, 2017 in related pending PCT Application Serial No. PCT/US2016/045179 filed on Aug. 2, 2016.

\* cited by examiner

FIELD INSTALLABLE LIGHT CURTAIN STATUS MODULE

TECHNICAL FIELD

Various embodiments relate generally to light curtain status indication.

BACKGROUND

Manufacturing facilities produce useful articles by processing component into finished goods. The operations used to process the components may involve transformational steps that change the article from one state to another. Some of these transformational operations employ machinery, such as presses, cutting tools, conveyor systems, ovens, or chemical applicators, for example.

Some manufacturing facilities use machinery that can be dangerous to humans. For example, a worker who walks into a zone of operation of a large robotic arm is at risk of serious bodily harm if the arm's motion profile intersects the worker's body or clothing. In another example, a worker who places a work piece in a press and reaches into the press while the press is activated could be severely injured.

To promote safety for operators and machines, many manufacturing machines are protected, either partially or entirely surrounded by light curtain systems. A light curtain safety system may cause a machine to be deactivated when an object interrupts any portion of the light curtain. For example, a hand extending through the light curtain may block one or more beams of the light curtain, which the light curtain may interpret as a potential danger condition. The light curtain may typically respond by causing the machine to be deactivated by, for example, engaging a braking system and/or interrupting electric power to motor drives that cause a press to move. A light curtain safety system may also prevent a machine from being activated when an object is present in any portion of the light curtain. For example, prior to machine startup, an operator who is standing too close, or within hazardous proximity, to a machine may block one or more beams of the light curtain. The light curtain may interpret this as a danger condition and prevent machine startup.

SUMMARY

Apparatus and associated methods relate to a modular plug-in accessory including a connector for making pluggable electrical connection to a cascading electrical output port for providing cascading connection from an elongate light curtain, the accessory comprising an omni-directional light indicator to illuminate a light signal indicative of a status of the light curtain, wherein the accessory is configured to releasably make or break operative connection to the end cap containing the output port while the end cap is sealably connected to an end of the light curtain. In an illustrative example, the accessory may plug in directly to the terminal end of a light curtain. The receiving light curtain may be connected at the distal end of a string of light curtains. In some examples, the accessory may provide high visibility status indication information about any of the light curtain segments in the string of light curtains.

Various embodiments may achieve one or more advantages. For example, some embodiments may provide integral, field-installable, or field-replaceable, omni-directional, light indicators for light curtain systems. Some embodiments may advantageously indicate the operational status of a light curtain by instant visual inspection from a distance and/or from any line of sight direction. Such systems may permit the addition of omni-directional visual status indication to one or more sections of a cascade light curtain system to permit operators to rapidly identify and isolate the source of, for example, a fault or lockout condition. This may advantageously reduce or substantially minimize downtime caused by such conditions in a light curtain protection system. In some implementations, faults or lockouts may be easily identified by visual inspection and without the need to resort to a control station, such as a programmable logic controller. In various examples, a low skilled operator may be able to add, replace, or remove a module from a field-installed light curtain in seconds or minutes, with or without a simple tool (e.g., screwdriver). Various embodiments permit field replacement without breaking a seal on a chamber that contains the optical elements of the light curtain, thus avoiding the risk of introducing contaminants that could degrade the electrical and/or optical performance of the light curtain. Accordingly, various embodiments may, without compromising light curtain performance, save time, expense, and increase production facility uptime, and thereby improve output productivity for a facility that incorporates light curtain systems, for example.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

To aid understanding, this document is organized as follows. First, field installable light curtain status modules (FILCSMs) are introduced with reference to FIGS. 1-3. Second, with reference to FIGS. 4-6B, the discussion turns to exemplary embodiments that illustrate electrical interfacing between the FILCSM and a light curtain system. Specifically, interfaces are described with reference to a single light curtain element, and to a terminal or end light curtain element of a light curtain system configured in a cascade arrangement. Finally, with reference to FIGS. 7-8, further explanatory discussion is presented to explain exemplary embodiments for generating control signals to the FILCSM in both single- and cascade-configured light curtain systems.

Figure 1:
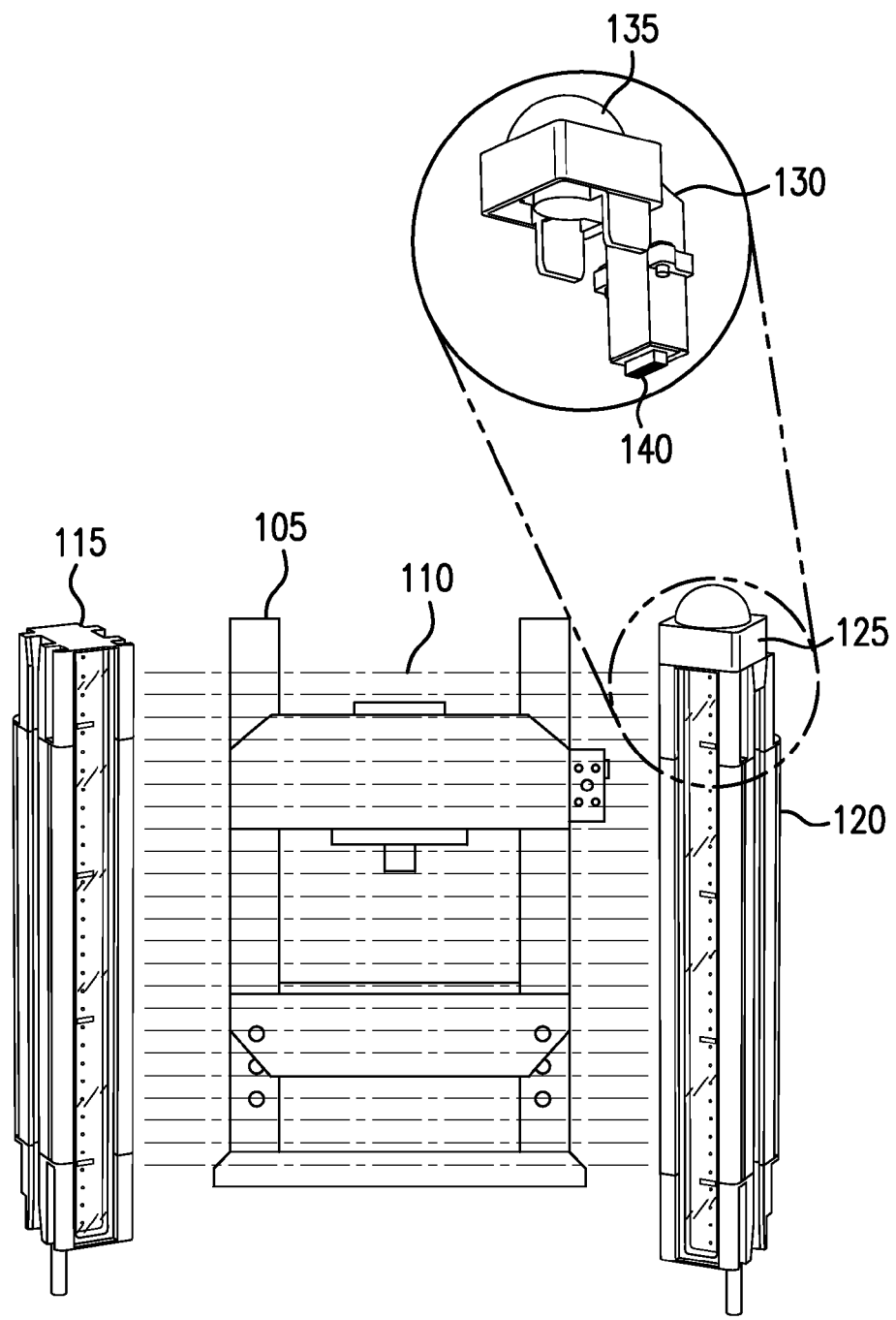
FIG. 1 depicts a schematic view of an exemplary machine protected by a light curtain having a field installable light curtain status module (FILCSM).

FIG. 1 depicts a schematic view of an exemplary machine protected by a light curtain having a field installable light curtain status module (FILCSM). In the depicted figure, a press machine 105 is operating behind a protective light curtain 110. The light curtain 110 is established between an emitter light curtain module (LCM) 115 that generates a series of vertically separated horizontal light beams, and a receiver LCM 120 that detects if the light beams are present or not (e.g., blocked). Failure of the receiver LCM 120 to detect one or more light beams may indicate a safety breach, and the light curtain system is operatively connected to disable the press machine 105 until the light beams are cleared. Based on the status condition of the LCMs 115, 120, a status condition may be visually indicated by a FILCSM 125 coupled to a distal end of the receiver LCM 120. In operation, the FILCSM 125 may emit an illumination signal corresponding to the status condition of the receiver LCM 120. For example, if the receiver LCM 120 detects a blocked beam, then it may respond by changing its illumination signal from green (all clear) to red (blocked). The FILCSM 125 emits a substantially omni-directional signal visible from any direction, so the operator may be able to rapidly recognize that the system has detected a block, so that the operator can react to clear the block so that the press machine 105 can resume production, for example.

In another embodiment, the press machine 105 may be powered down for routine maintenance. Once the maintenance is completed, an operator may attempt to apply power to the press machine 105 but an object or operator is blocking one or more horizontal light beams between the emitter LCM 115 and receiver LCM 120, thereby indicating a safety breach. The light curtain system is operatively connected to enable the press machine 105 once the light beams are cleared. This status condition of the LCMs 115, 120, may be visually indicated by a FILCSM 125 coupled to a distal end of the receiver LCM 120. In various embodiments, it is anticipated that multiple light curtain systems may reside on a given manufacturing machine, based upon the complexity, number of transformational operations or hazardous regions present. In this manner, the substantially omni-directional signal emitted by one or more FILCSMs 125 permits an operator to rapidly recognize which of the light curtain systems should be investigated.

In various embodiments, the FILCSM 125 may emit a number of illumination signals to indicate a corresponding number of status conditions. For example, illumination signals may include, by way of example and not limitation, Red, Yellow, and Green, each color representing, for example, lockout mode, reset, and normal operation (RUN), respectively. In some implementations, further illumination signals may include modulation patterns for selected colors. For example, red flash/off/green flash sequence may represent power is applied. Red flashing may indicate a lockout status, with error detected, for example. Various modulation patterns of amplitude, frequency, duty cycle, wavelength, or combinations of such parameters, may be employed to operate the FILCSM to make visually apparent indications of the status condition of one or more light curtains, alone or in a network configuration.

In further detail, the FILCSM 125 includes a housing 130 extending between a lens 135 and an electrical interface 140.

The housing 130 is adapted to conform to an end cap of the LCM 120, such that the FILCSM 125 can be supported by the unaltered end of the LCM. To install the FILCSM 125, the operator can simply plug the FILCSM 125 into a distal end of the LCM 120. When pluggably connected, the electrical interface 140 engages a mating connector in the end cap of the LCM 120. To remove or replace the FILCSM 125, the operator can simply unplug the FILCSM 125 from the end cap connector. In some embodiments, a clip, snap, or securing mechanism (e.g., screws) may be used to maintain secure contact while the FILCSM 125 is plugged into the end cap. Plugging or unplugging the FILCSM 125 from the LCM 120 does not involve removing the end cap, which may be sealably attached to seal an open end of the LCM 120, which may form a tube having, for example, a 3 sided metal (e.g., aluminum) extrusion, with the open side bridged by a transparent optical lens. The end cap sealed to an end of this tube may advantageously protect the electronic and optical components from exposure to contaminants. The FILCSM 125 may advantageously add the functionality of a highly visible, omnidirectional status indicator, with simplified mounting requirements, that can readily be installed by operators in the field, even with little or no training, tools, or other equipment. Some embodiments may simply plug into the LCM 125 without the need for tools.

Either instead of, or in addition to, the FILCSM 125 being mounted on the receiver LCM 120, some embodiments may include the LCM 125 mounted to the emitter LCM 115. To simplify explanation, however, further discussion may refer to mounting to the LCM, which may be understood as contemplating the FILCSM 125 being mounted to either or both the emitter and/or receiver of a light curtain system. Unless expressly stated otherwise, the FILCSM 125 may be pluggably mounted to any available cascade port in a light curtain system.

FIGS. 2A-2D depict side and end views of an exemplary FILCSM and the corresponding port of a light curtain element. In the depicted figure, a light curtain module includes an elongate body 205 extending along a longitudinal axis between a proximal end and a distal end. At the distal end of the body 205 is an end cap 210 sealingly attached to the body 205 to substantially prevent the ingress of dust or other contaminants into the chamber formed in the body and end cap for the electronics and optical components that provide the safety curtain functionality, for example. Formed in opposing outer walls of the body 205 and the end cap 210 is an elongate groove 215 extending parallel to the longitudinal axis. Plugged into the end cap 210 is the housing 130 of the FILCSM 125.

Figure 2A:
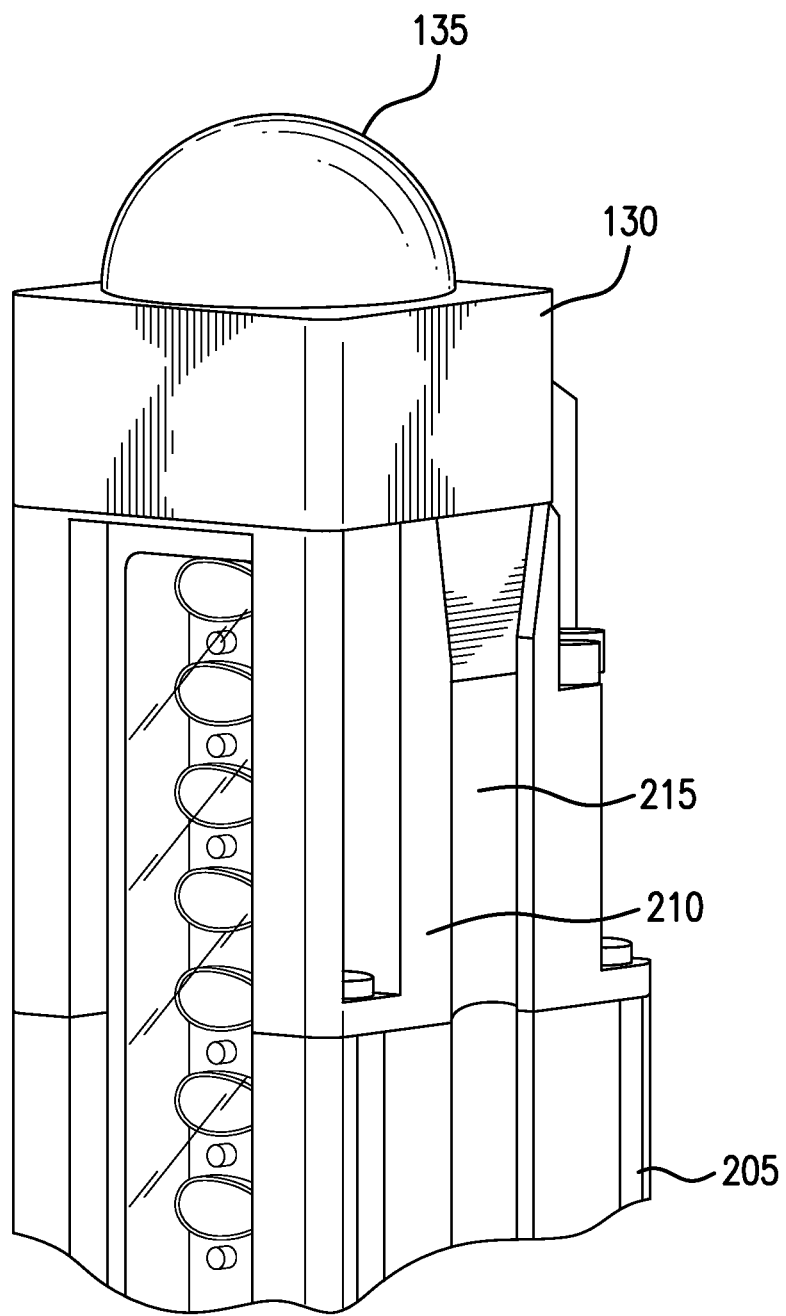
FIGS. 2A-2D depict side and end views of an exemplary FILCSM and the corresponding port of a light curtain element.
Figure 2B:
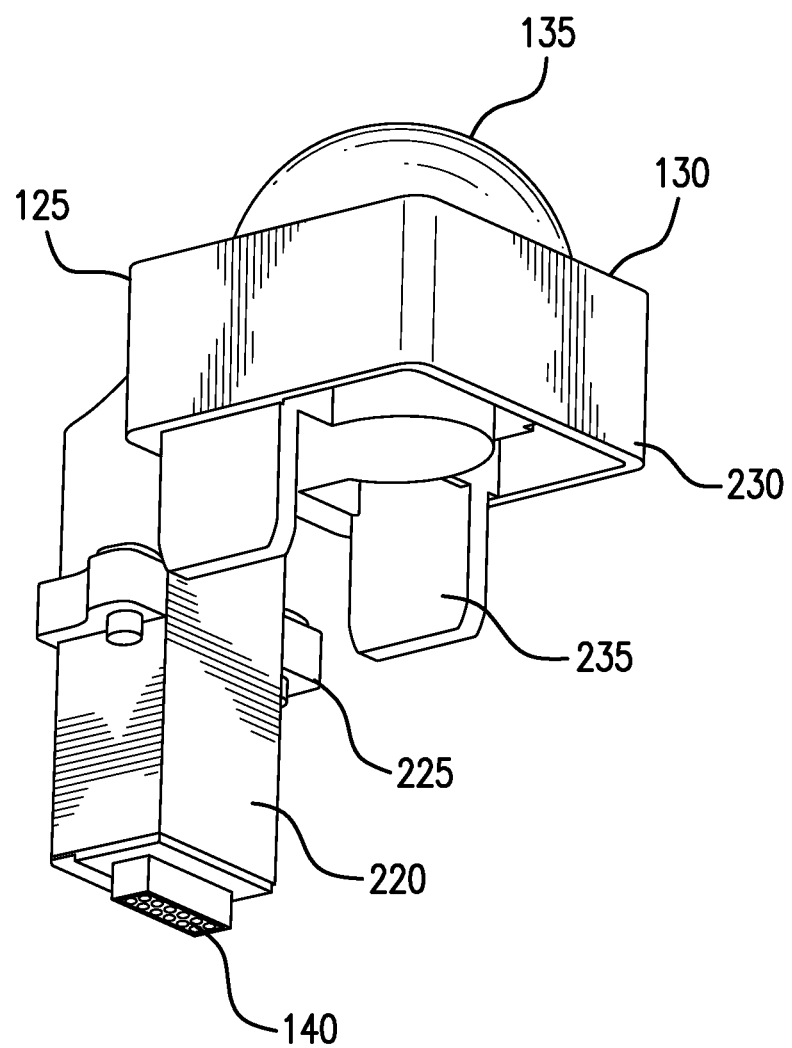

Referring to FIG. 2B, the housing 130 of the FILCSM 125 extends along a longitudinal axis (which may be parallel to the longitudinal axis of the LCM body 205) between a proximal end and a distal end. An electrical interface 140 is disposed at a proximal end of the housing 130. The electrical interface 140 includes a connector for making pluggable electrical connection to a cascading electrical output port (see FIG. 2C, item 240) that is disposed in a seal member sealably attached to a light curtain module. The electrical interface 140 is configured to pluggably make or break operative connection to the cascading electrical output port while the seal member is sealably connected to the light curtain. In the depicted example, the seal member is the end cap 210.

The housing 130 extends from a proximal end through an elongate extension member 220, which has a securing member 225. As depicted, the securing member 225 is attached to the sides of the extension member 220, and provides screw holes for releasably securing the housing 130 to the end cap 210. The distal end of the extension member 220 is formed with a body 230 that substantially rests on and matches, in this example, a form factor of a top of the end cap 210. The body 230 forms a cup, which may include light generating components, and serves as a base for an attached translucent window, or the lens 135. Extending down from two opposing sides of the body 230, each of the opposing sides adjacent to the side with the extension member 220, are two alignment tabs 235 that help to register the electrical interface 140 with its mating connector in the end cap 210. In particular, the alignment tabs 235 are received in the elongate groove 215 prior to the electrical interface 140 seating with its mating connector. An example of the mating connector is described with reference to a cascading electrical output port 240 of FIG. 2C.

The lens 135 may be advantageously configured to permit illumination generated by the light generating components within the FILCSM 125 to be visible from within the window, or the lens 135, to substantially any direction that lies in a plane orthogonal to the longitudinal axis of the housing. The light generating components may be included in a light generation module disposed within an interior volume defined by the housing 130 and the lens 135, for example.

Figure 2C:
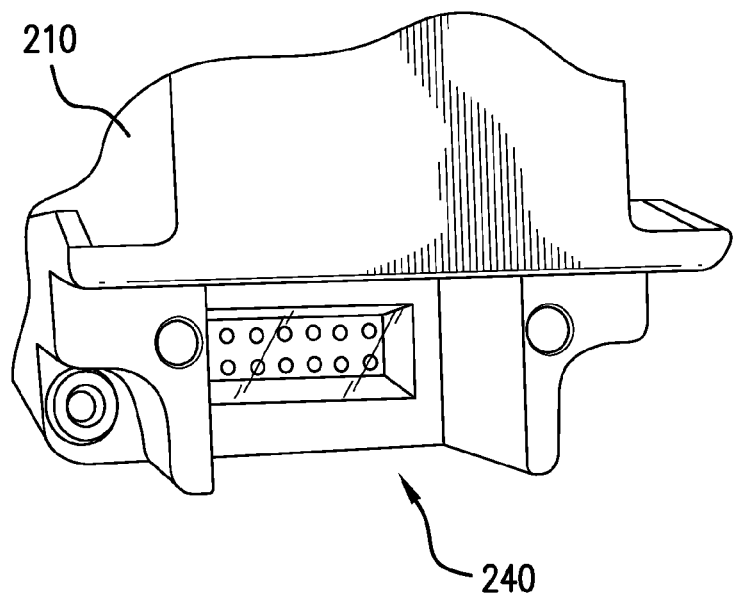
Figure 2D:
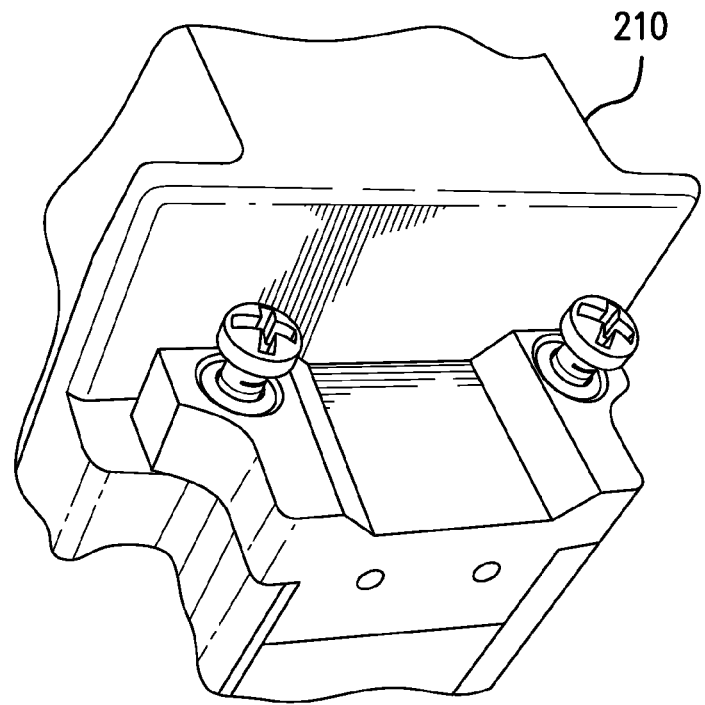

As depicted in FIG. 2C, the LCM end cap 210 includes a cascading electrical output port 240 that is disposed in a seal member sealably attached to a light curtain module. The electrical interface 140 is configured to pluggably make or break operative connection to the cascading electrical output port 240 while the seal member (e.g., the end cap 210) is sealably connected to the light curtain body 205. FIG. 2D depicts an end cap cover 245 that can be plugged or set in place to protect the cascading electrical output port 240.

Figure 3:
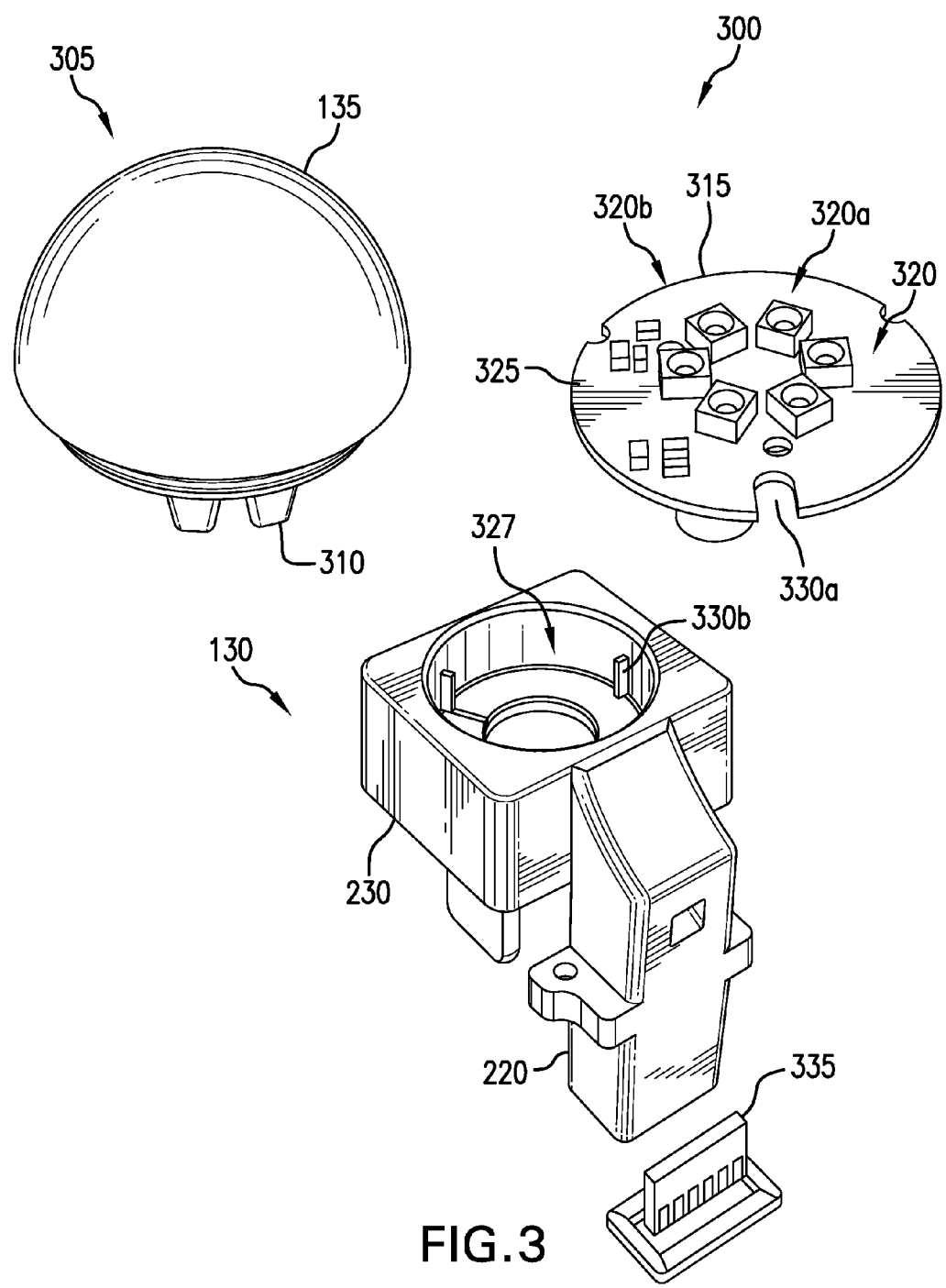
FIG. 3 depicts an exploded assembly view of an exemplary FILCSM.

FIG. 3 depicts an exploded assembly view of an exemplary FILCSM. In the depicted figure, a FILCSM assembly 300 includes a lens body 305 having a substantially dome shaped lens window portion, an example of which is described with reference to the lens 135 in FIG. 1. The lens body 305 further includes a base portion having projection members 310 that form a downward opening saddle. The FILCSM assembly 300 further includes a light generation module 315 including a light engine 320 formed with a number of LEDs 320a and supporting circuitry 320b on a circuit board assembly 325. In some embodiments, the LEDs 320a in the light engine 320 may include, for example, a set of at least one bi-color red/green LED and a set of at least one yellow LED. Some examples may include one or more multi-color LEDs capable of illuminating with 3 or more spectral profiles, which may include colors characterized predominantly by visible, infrared, and/or ultraviolet wavelengths, for example.

The lens body 305 and the light generation module 315 are supported on the housing 130, which includes the body 230 and the extension member 220. The body 230 has a cup-shaped receptacle 327 to receive the circuit board assembly 325 of the light generation module 315. Extending radially inwardly from interior facing walls of the cup in the body 230 are mounting boss tabs 330b (e.g., spaced apart by about 120 degrees, as in the depicted example). The circuit board assembly 325 of the light generation module 315 has peripheral cut outs 330a that receive the boss tabs 330b when the module 315 is assembled in the cup 327 of the body 230. In some examples, the boss tabs 330b may also engage to retain with the lens body 305 and the saddles of the downward projecting members 310.

The FILCSM assembly 300 includes an electrical interface 335 at the proximal end of the extension member 220. In various examples, there is at least one control terminal in the electrical interface 335. When the electrical interface 335 is pluggably connected to the cascading electrical output port 240 of the end cap 210, the control terminal is adapted to receive a status control signal indicative of a status condition of the light curtain module 120. The electrical interface 335 conveys the status control signal(s) to the light engine 320.

The light generation module 315 is operably connected to the electrical interface 335 to receive the status control signal(s). In response to the status control signal, the light generation module 315 may generate an illumination output signal indicative of the status condition of the light curtain module 120.

Figure 4:
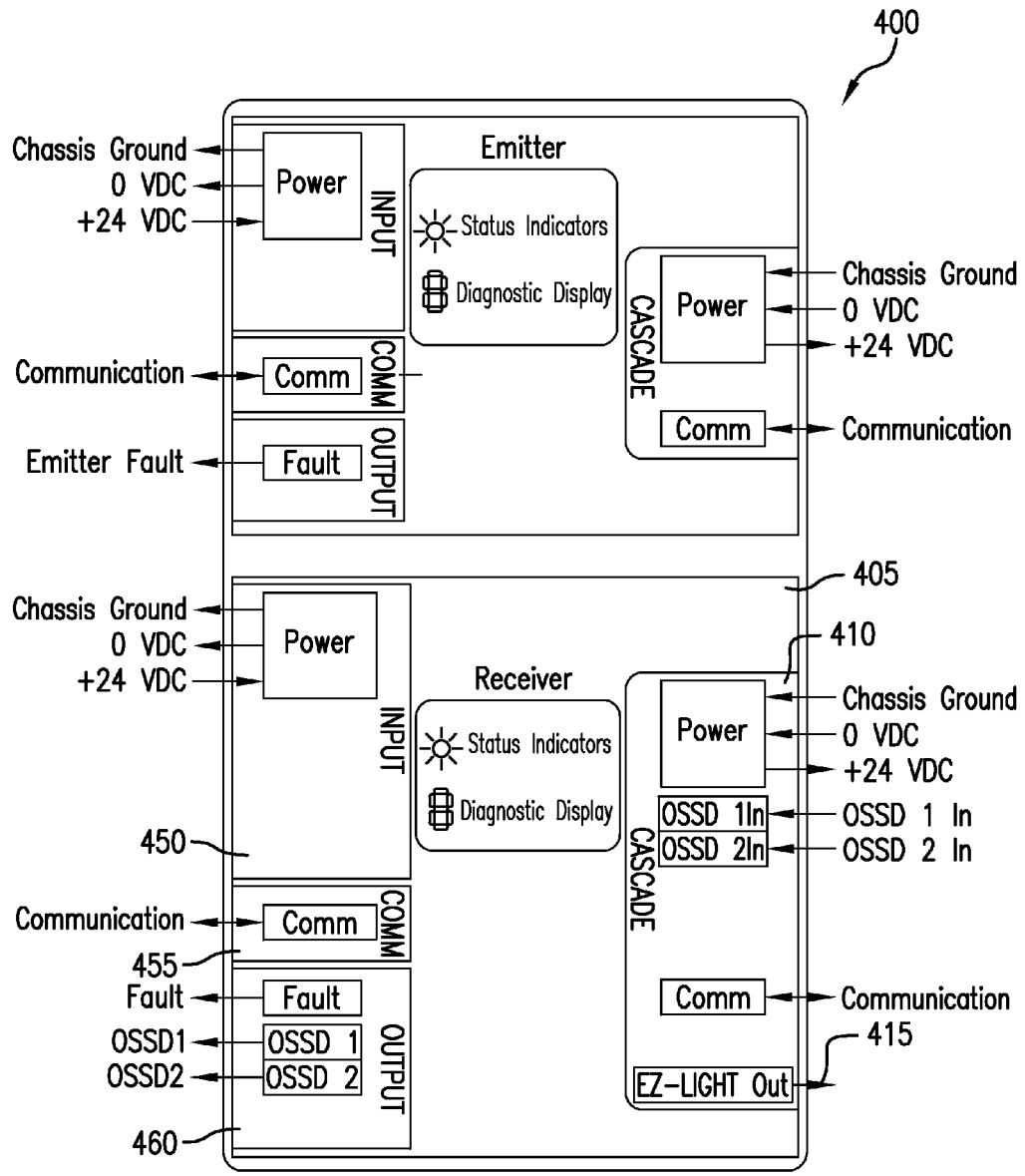
FIG. 4 depicts a schematic block diagram of an exemplary emitter and receiver of a light curtain operable with a FILCSM.

FIG. 4 depicts a schematic block diagram of an exemplary emitter and receiver of a light curtain operable with a FILCSM. In the depicted figure, a light curtain stage 400 (e.g., emitter and receiver) includes the receiver LCM 405, which has a cascade interface 410. The cascade interface 410 includes a FILCSM output port 415, along with power/ground (e.g., +24 VDC), OSSD (e.g., relay control signals to disable machinery, such as press machinery described with reference to FIG. 1, in a protection scenario) and a bi-directional communication port for communicating, for example, with a downstream LCM. Exemplary cascade operations for the FILCSM will be described in further detail with reference to at least FIGS. 6A-8. Further, the receiver LCM 405 includes one or more ports for a set of inputs 450, a communication (comm) module 455, and an output interface 460.

Figure 5A:
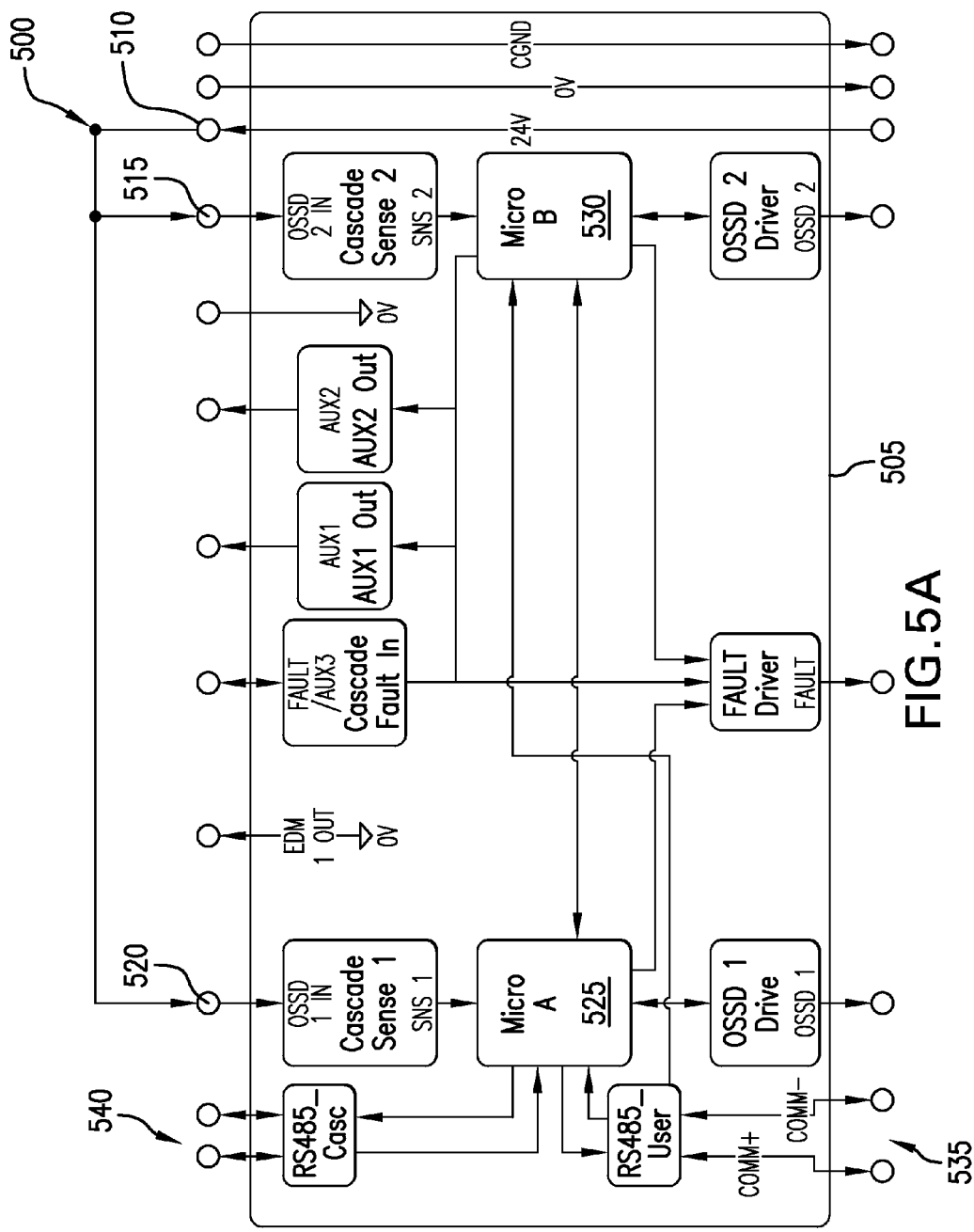
FIG. 5A-5B depict schematic block diagrams of an exemplary end light curtain operable without or with a FILCSM.
Figure 5B:
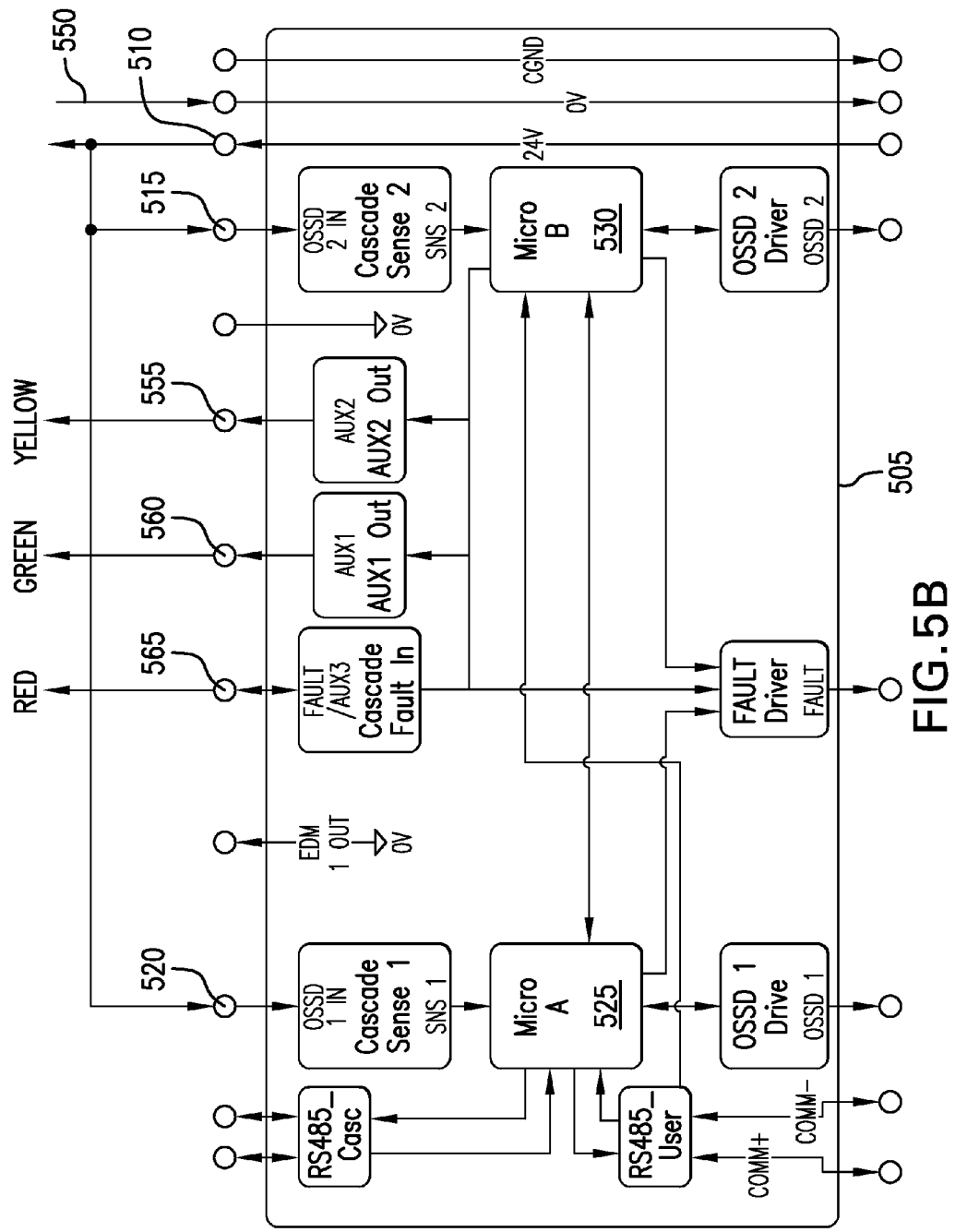

FIG. 5A-5B depict schematic block diagrams of an exemplary end light curtain operable without or with a FILCSM. In FIG. 5A, a receiver LCM 500 includes a controller module 505 for a LCM, including a set of signal ports at a proximal end, and a set of signal ports at a distal end, referred to herein as a cascading electrical output port. In the depicted configuration, no FILCSM is provided, however a termination plug is applied to the cascading electrical output port. In particular, the terminator routes supply voltage (24V) port 510 from the cascading electrical output port back into the cascading electrical output port's OSSD 2 IN port 515 and OSSD 1 IN port 520. The OSSD 1 IN port 520 circuitry outputs a sense signal to a microprocessor A 525, and the OSSD 2 IN port 515 circuitry outputs a sense signal to a microprocessor B 530. The micro A 525 communicates with the micro B 530, and with a RS485 port 535 on the proximal signal ports, and with a RS485 port 540 on the distal signal ports of the cascading electrical output port, an example of which is described with reference to item 240 of FIG. 2C. In some embodiments, the micro A 525 may communicate with RS485 port 540 in the event of a block. The RS485 port 535 may send signals to the micro A 525 to provide status. The micro A 525 may send a signal (e.g., turn all indicators on) to the RS485 port 535 only for the purposes of performing, for example, a factory test.

When the controller module 505 connects to a FILCSM pluggably connected to the cascading electrical output port, a 0V pass through net 550 is connected to the FILCSM, as is the 24V port 510, which is still fed back to the OSSD input ports 515, 520.

Three status conditions are configured to be shown by use of 3 different colors controlled by 3 independent status control signals on Yellow port 555, Green port 560 and Red port 565. In the depicted embodiment, the micro B 530 drives port AUX1 Out, AUX 2 Out, and Fault/AUX3

Cascade Fault IN circuits, which generate the Green, Yellow, and Red signals on the ports 555, 560, and 565.

Figure 6A:
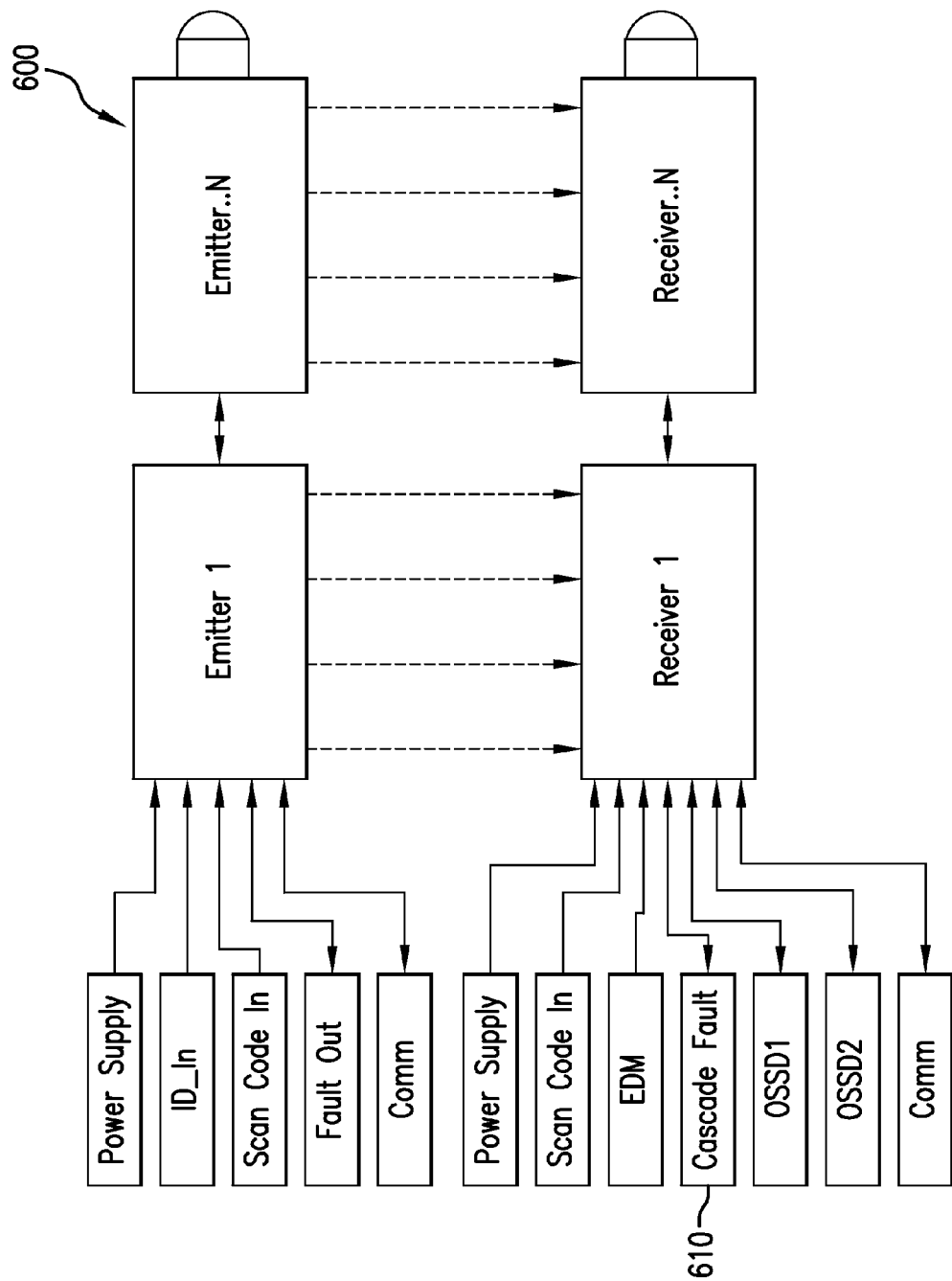
FIGS. 6A-6B depict schematic block diagrams of an exemplary cascaded light curtain systems operable with a FILCSM.
Figure 6B:
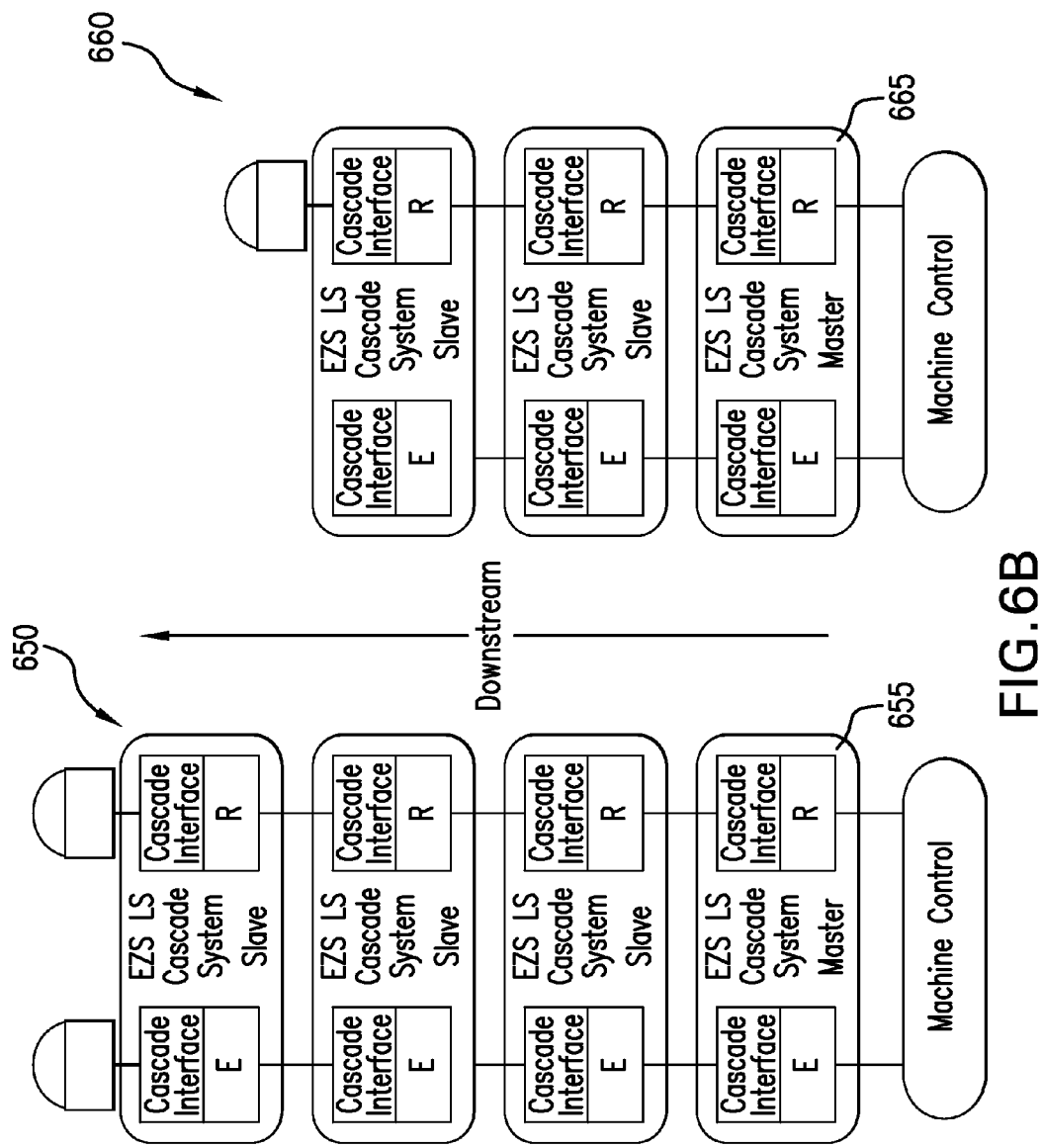

FIGS. 6A-6B depict schematic block diagrams of an exemplary cascaded light curtain systems operable with a FILCSM. In the depicted system 600, at least two emitters are connected in cascade, as are a corresponding number of cascade-connected receivers. The receiver at the proximal end of the string may be referred to as the master, and the downstream receiver LCMs may be referred to as slaves. In the depicted embodiment, the end slave receiver and the end slave emitter both have a FILCSM installed to provide omnidirectional, high visibility status indication for the receiver string and for the emitter string, respectively. Any fault status conditions identified in operation of any one of the emitters in the string will be propagated to the end slave emitter, and converted to a corresponding illumination signal indicative of the status condition.

In the depicted system of FIG. 6A, the master receiver at its proximal port, outputs signals (cascade fault signal 610, OSSD1, OSSD2, Comm), and the master receiver receives as inputs power supply, scan code in, and EDM.

In the exemplary embodiments of FIG. 6B, a four stage cascade light curtain network 650 begins at its proximal end by both the emitter and receiver of the master stage 655 connecting to a machine control. In this embodiment, the end slave emitter and the end slave receiver both terminate in a FILCSM.

A three stage cascade light curtain network 660 begins at its proximal end by both the emitter and receiver of a master stage 665 connecting to a machine control. In this embodiment, the end slave receiver terminates in a FILCSM.

Figure 7:
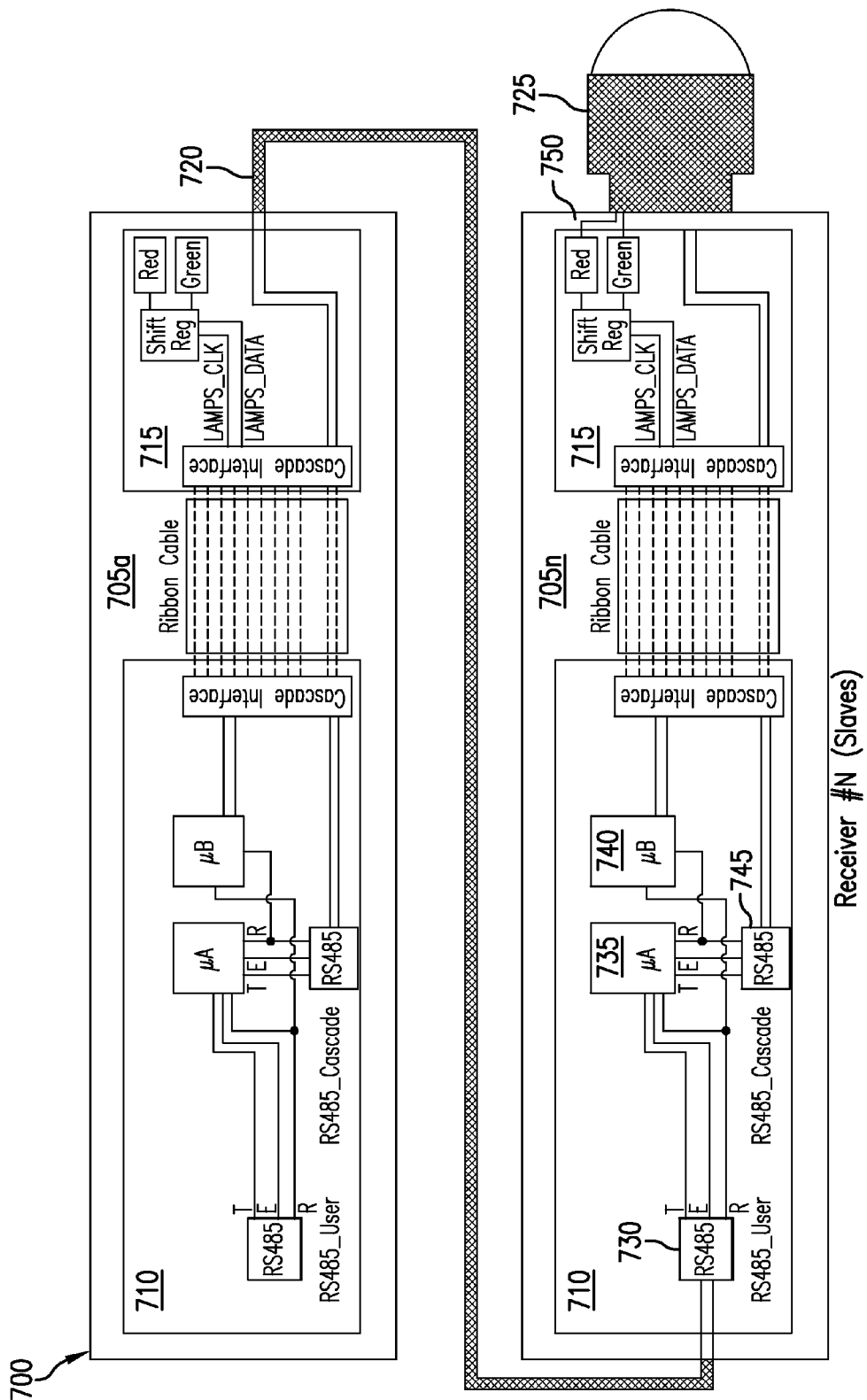
FIG. 7 depicts a schematic block diagrams of a cascaded light curtain illustrating exemplary FILCSM control signal processing.

FIG. 7 depicts a schematic block diagram of a cascaded light curtain illustrating exemplary FILCSM control signal processing. In the depicted figure, a cascade network 700 has a string of N substantially similar light curtain modules 705a-705n. Each LCM 705 includes, in relevant part, a control module 710, operably connected to a cascade interface module 715 via a ribbon cable. The cascade output signal from each of the LCM 705a-705(n-1) is routed to an input of control module 710 of the subsequent (slave) LCM 705 via a cable 720. The cascade output signal from the end slave LCM 705n is routed into a FILCSM 725. This cascade output signal may control, for example, the indication illumination pattern for the Yellow LED, for example. In addition, the end slave LCM 705n supplies, in this example, red and green signals processed through circuitry 750 to control the respective red and green illumination patterns emitted by the FILCSM 725.

The control module 710 includes an RS485 interface 730, a micro A 735, a micro B 740, and an RS485 Cascade interface 745. An exemplary implementation of the micro A 735 and micro B 740 is described with reference to micro A 525 and micro B 530 in FIGS. 5A-5B. The interface 730 receives a cascaded status signal indicating a status condition of an upstream LCM 705.

If a fault, lockout, error, or other status condition is present anywhere in the upstream string, that LCM will operate the micro A 735 to generate the appropriate status condition signal, and transmit the generated status condition signal via the interface 745 to the cable 720. From there it will be received by the next subsequent downstream LCM. If the status condition arises in the end slave LCM 705n, then the status condition signal is routed into the FILCSM 725 rather than the cable 720.

In the LCMs not connected to the FILCSM 725, the red and green signals processed through circuitry 750 are not used. In the end slave module LCM 705n, the red and green signals processed through circuitry 750 are operatively connected to the FILCSM 725. In the depicted figure, status condition signals received by the interface 730 are conveyed to and processed by the micro A 735 and micro B 740, which generate the appropriate clock and data signals to create, via a shift register and red and green interface circuits in the circuitry 750, the proper signals to yield a predetermined illumination pattern to indicate the status condition(s) extant in an LCM in the network 700.

Figure 8:
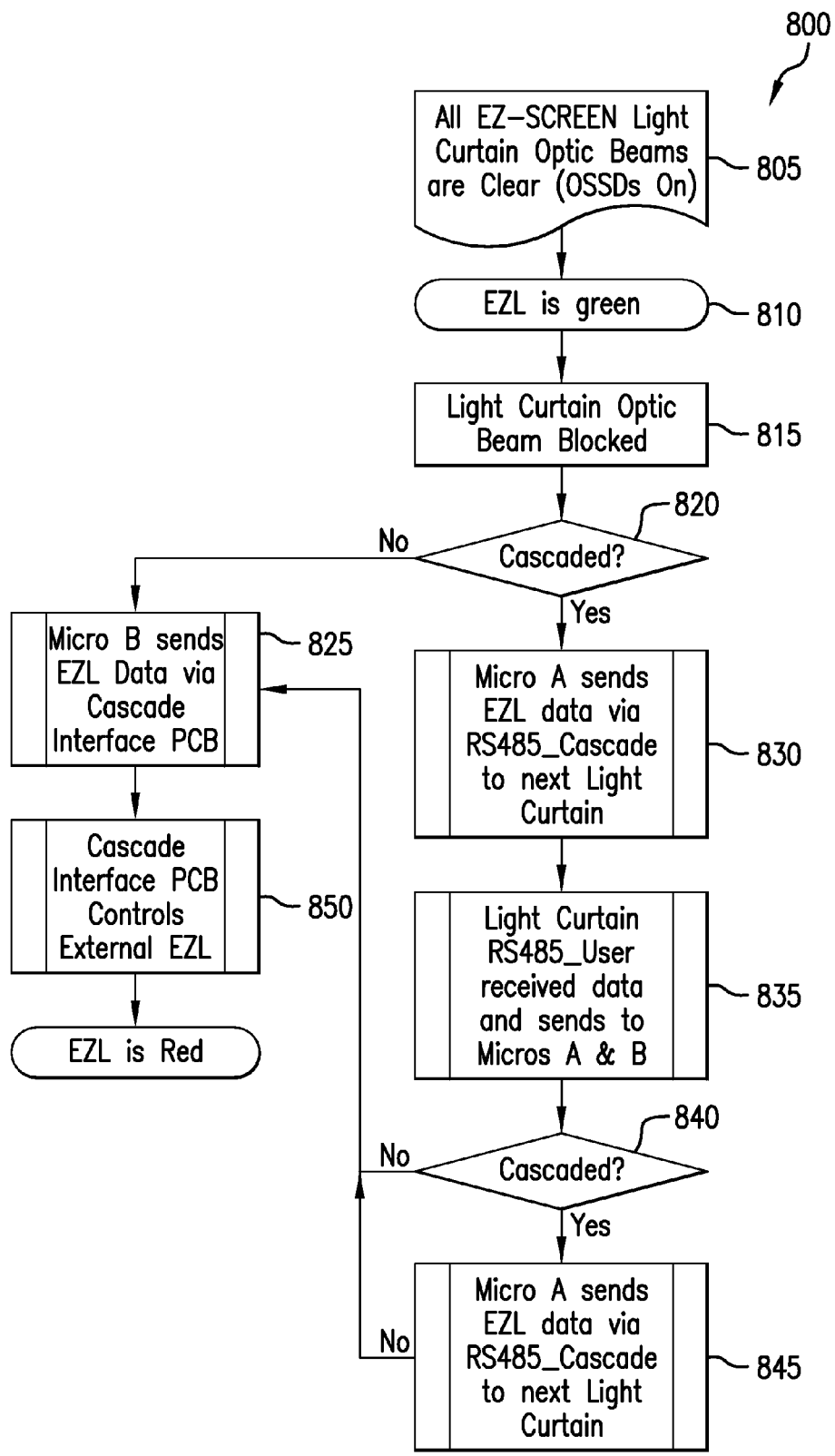
FIG. 8 depicts a flow chart diagram of exemplary FILCSM control signal processing in the cascaded light curtain of FIG. 7.

FIG. 8 depicts a flow chart diagram of exemplary FILCSM control signal processing in the cascaded light curtain of FIG. 7. A method 800 begins at 805 with all light curtain beams indicating clear such that all OSSDs are on. At 815, the FILCSM 725 indicates green corresponding to the status condition signal of all clear. At 815, the system detects that a light curtain beam is blocked. If, at 820, the light curtain module is not cascaded with at least one subsequent downstream stage, then, at 825, the Micro B 740 sends the status condition signal data to the cascade interface module 715 so that it can be output to a FILCSM 725, if one is pluggably connected thereto, at 850.

However, if, at 820, the light curtain module is cascaded with at least one subsequent downstream stage, then, at 830, the Micro A 735 sends a status condition signal with data indicating the status condition of the LCM to the cascade interface module 715 so that it can be output to the next subsequent downstream LCM 705 via the cable 720.

The interface 730 of the next subsequent downstream LCM 705 receives the status condition signal data at 835, and forwards the status condition signal data to the micro A 735 and micro B 740. If at 840, the light curtain module is cascaded with at least one subsequent downstream stage, then, at 845, the Micro A 735 sends a status condition signal with data indicating the status condition of the LCM to the cascade interface module 715 so that it can be output to the next subsequent downstream LCM 705 via the cable 720, and the method continues at step 825. If at 840, the light curtain module is not cascaded with at least one subsequent downstream stage, then, the method continues at step 825.

After step 850, the method 800 finishes with the FILCSM 725 illuminating a red signal to indicate that the light curtain is in a blocked condition from step 815.

Although various embodiments have been described with reference to the Figures, other embodiments are possible. For example, some embodiments may attach to a distal end of a terminal light curtain connected in a string of light curtains arranged in a network. In some implementations, the network of light curtains may include segments of one or more serially connected light curtains. The light curtains in the network may be receivers, transmitters, or a combination of both. Some light curtain segments may include optical transmitter elements, optical receiver elements, or both.

Some networks may include one or more branches of at least one light curtain, where the branches may be connected in parallel. In some examples, the branches may branch off from a connection to a common light curtain or a common control node. In some embodiments, a single light curtain status indicator (LCSI) module may indicate the status for its branch only. In some embodiments, a single LCSI module may indicate the status for every light curtain in the network to which it is connected. In some examples, the LCSI and branch may be configured to detect and announce or indicate status information only for light curtain elements in its own branch, and/or in a common trunk segment or segments that connect the LCSI module back to a proximal source end. As such, an LCSI module may be located at a terminal end of every branch in the network to provide an indication, based on the status of two or more LCSI indications, a localization of a status condition. In an illustrative example, a network having a common trunk segment of 3 series-connected light curtains that splits into three independent branches of 1 to 2 series light curtains, each terminal light curtain may have a terminal curtain with an LCSI module. In the event that one of the terminal light curtains indicates a fault (e.g., red) while the other two branches have their LCSI module indicating green, the system may allow the operator to quickly isolate the fault as limited to the branch indicating such a fault. The operator would be able, by quick visual inspection without tools or computer access, determine that the fault was not indicated in the common trunk segment. This may advantageously permit continued operations to be protected by the branches still indicating clear, thereby limiting downtime to those operations being protected by the branch indicating the fault.

In some embodiments, a modular plug-in accessory may include a connector for making pluggable electrical connection to a cascading electrical output port for providing cascading connection from an elongate light curtain. The accessory may incorporate an omni-directional light indicator to illuminate a light signal indicative of a status of the light curtain, wherein the accessory is configured to releasably make or break operative connection to the end cap containing the output port while the end cap is sealably connected to an end of the light curtain.

In various implementations, a light accessory may be pluggably connectable to an end cap of a light curtain segment. At least one large, omni-directional indicator light may visually indicate operational status (e.g., shut down, clear, muting) of the light curtain. Generally, muting may refer to a state in which the light curtain system may ignore a blockage of one or more light curtain beam(s), typically for a limited period of time. When in a muted state, for example, the light curtain may not respond to blockage of one or more light beams, e.g., the light curtain may not disable operation of machinery operatively connected to the light curtain in response to the blockage.

Some embodiments may provide a replaceable accessory light that is large and bright enough to be seen from a distance but is also able to be plugged directly into the light curtain cascade port. In some embodiments, the accessory can be installed and removed without breaking a sealable connection of the end cap to the light curtain body. Various embodiments may provide for field replacement without compromising the seal, which may advantageously prevent opportunity for ingress of contaminants (e.g., dust, foreign objects, moisture) into the electronics/optics chamber, which could compromise light curtain electrical and/or optical performance, and thereby worker safety.

Safety light curtains are commonly used in manufacturing to provide an invisible fence of protection such that objects or persons passing through them will trigger an emergency stop of machinery thereby protecting human life. It is common practice for these light curtains to be extendable or cascaded to provide coverage over a larger surface area as an alternative to making custom lengths. The curtain must be cleared in order to restart the machinery. Some installations provide an illuminated status of the light curtain. This may afford an opportunity to nearby personnel to determine if the curtain is active or not. In some examples, the implementation may promote rapid localization of status issues in a network of light curtains or systems of light curtains.

Various implementations may advantageously include an omnidirectional light source viewable from all radial directions, so that the status is viewable from a distance and a wide range of angles. Additionally, in the event of LED failure, the entire light curtain may remain in the field, and just the FILCSM may be unplugged and replaced without disturbing alignment, calibration, or interrupting continuous protection of the curtain system, which may thereby mitigate a potential source of unproductive downtime. Various embodiments may advantageously permit the FILCSM to be hot swapped, or removed and replaced with a new FILCSM, while the light curtain is powered up and in protection mode.

Various embodiments may advantageously indicate light curtain status without the need for routing a control signal from the light curtain to an external relay in order to control a separate accessory light. Accordingly, various embodiments may advantageously reduce or substantially eliminate costs associated with wiring, additional programming and configuration. Still further advantages may be yielded from avoiding the added expense of consuming an additional control relay output port. Various implementations may advantageously require no mounting labor or space, because the status indicator is plugged onto the existing light curtain module. These advantages may be rapidly achieved at low cost in that the FILCSM may be field installable without modifying or replacing the existing light curtain modules. In some embodiments, a terminator plug maybe removed, for example, with two screws, and the terminator plug is replaced on the end cap of the light curtain module with the FILCSM.

Various embodiments may provide a field replaceable accessory light that is large and bright enough to be seen from a distance but is also able to be plugged directly into the light curtain cascade port.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated within the scope of the following claims.

What is claimed is:
1. An apparatus of a field installable light curtain status module, the apparatus comprising:
 a housing extending along a longitudinal axis between a proximal end and a distal end;
 an electrical interface disposed at a proximal end of the housing and including a connector for making pluggable electrical connection to a cascading electrical output port that is disposed in a seal member sealably attached to a light curtain module, wherein the electrical interface is configured to pluggably make or break operative connection to the cascading electrical output port while the seal member is sealably connected to the light curtain;
 at least one control terminal in the electrical interface, wherein when the electrical interface is pluggably connected to the cascading electrical output port, the control terminal is adapted to receive a status control signal indicative of a plurality of status conditions of the light curtain module;
 a light generation module operably connected to the electrical interface to receive the status control signal, wherein in response to the status control signal the light generation module generates a first illumination output signal indicative of an all beams clear status condition of the light curtain module, and a second illumination output signal indicative of a beam blocked or lockout status condition of the light curtain module; and, a translucent window at the distal end of the housing and configured to permit the first and second illumination output signals to be visible from within the window to substantially any direction that lies in a plane orthogonal to the longitudinal axis, wherein the light generation module is disposed within an interior volume defined by the housing and the translucent window.

2. The apparatus of claim 1, wherein, when the electrical interface is pluggably disconnected from the cascading electrical output port, the cascading electrical output port is configured for cascading connection of operating signals from the light curtain module to operate at least one downstream light curtain module connected to the light curtain module.

3. The apparatus of claim 1, wherein, when the light curtain is connected as an end segment in a string of cascade-connected light curtain modules, the status control signal is further indicative of a status condition of any of the segments in the string of light curtain modules.

4. The apparatus of claim 1, wherein the light curtain module is connected as the distal segment of a string of a plurality of cascade-connected light curtain modules.

5. The apparatus of claim 4, wherein the electrical interface is pluggable directly to the cascading electrical output port, and the seal member comprises a distal end cap of the light curtain module.

6. The apparatus of claim 1, wherein the housing is mechanically supported by seal member when the electrical interface is pluggably connected to the cascading electrical output port.

7. The apparatus of claim 1, wherein the seal member comprises an end cap sealed to a distal end of the light curtain module.

8. The apparatus of claim 1, wherein the window comprises a substantially dome-shaped lens.

9. The apparatus of claim 1, wherein the light curtain module comprises a light curtain emitter module to generate light beams of the light curtain detectable by a corresponding light curtain receiver module.

10. The apparatus of claim 1, wherein the light curtain module comprises a light curtain receiver module to detect light beams of the light curtain generated by a corresponding light curtain emitter module.

11. An apparatus of a field installable light curtain status module, the apparatus comprising:

a housing extending along a longitudinal axis between a proximal end and a distal end;

an electrical interface disposed at a proximal end of the housing and including a connector for making pluggable electrical connection to a cascading electrical output port that is disposed in a seal member sealably attached to a light curtain module, wherein the electrical interface is configured to pluggably make or break operative connection to the cascading electrical output port while the seal member is sealably connected to the light curtain;

at least one control terminal in the electrical interface, wherein when the electrical interface is pluggably connected to the cascading electrical output port, the control terminal is adapted to receive a status control signal indicative of a status condition of the light curtain module;

a light generation module operably connected to the electrical interface to receive the status control signal, wherein in response to the status control signal the light generation module generates a predetermined illumination output signal indicative of the status condition of the light curtain module; and, a translucent window at the distal end of the housing and configured to permit the predetermined illumination to be visible from within the window to substantially any direction that lies in a plane orthogonal to the longitudinal axis, wherein the light generation module is disposed within an interior volume defined by the housing and the translucent window.

12. The apparatus of claim 11, wherein, when the electrical interface is pluggably disconnected from the cascading electrical output port, the cascading electrical output port is configured for cascading connection of operating signals from the light curtain module to operate at least one downstream light curtain module connected to the light curtain module.

13. The apparatus of claim 11, wherein, when the light curtain is connected as an end segment in a string of cascade-connected light curtain modules, the status control signal is further indicative of a status condition of any of the segments in the string of light curtain modules.

14. The apparatus of claim 11, wherein the light curtain module is connected as the distal segment of a string of a plurality of cascade-connected light curtain modules.

15. The apparatus of claim 14, wherein the electrical interface is pluggable directly to the cascading electrical output port, and the seal member comprises a distal end cap of the light curtain module.

16. A method of operating field installable light curtain status modules, the method comprising:

providing a housing extending along a longitudinal axis between a proximal end and a distal end;

making pluggable electrical connection, from a connector in an electrical interface disposed at a proximal end of the housing, to a cascading electrical output port that is disposed in a seal member sealably attached to a light curtain module, wherein the electrical interface is configured to pluggably make or break operative connection to the cascading electrical output port while the seal member is sealably connected to the light curtain;

receiving a status control signal indicative of a status condition of the light curtain module at at least one control terminal in the electrical interface when the electrical interface is pluggably connected to the cascading electrical output port;

providing a light generation module operably connected to the electrical interface to receive the status control signal;

in response to the status control signal, generating with the light generation module, a predetermined illumination output signal indicative of the status condition of the light curtain; and, providing a translucent window at the distal end of the housing and configured to permit the predetermined illumination to be visible from within the window to substantially any direction that lies in a plane orthogonal to the longitudinal axis, wherein the light generation module is disposed within an interior volume defined by the housing and the translucent window.

17. The method of claim 16, wherein, when the electrical interface is pluggably disconnected from the cascading electrical output port, the cascading electrical output port is configured for cascading connection of operating signals from the light curtain module to operate at least one downstream light curtain module connected to the light curtain module.

18. The method of claim 16, wherein, when the light curtain is connected as an end segment in a string of cascade-connected light curtain modules, the status control signal is further indicative of a status condition of any of the segments in the string of light curtain modules.

19. The method of claim 16, further comprising connecting the light curtain module as the distal segment of a string of a plurality of cascade-connected light curtain modules.

20. The method of claim 19, further comprising plugging the electrical interface directly to the cascading electrical output port.

\* \* \* \* \*